United States Patent [19]
Horii et al.

[11] Patent Number: 5,601,354
[45] Date of Patent: Feb. 11, 1997

[54] ILLUMINATING DEVICE

[75] Inventors: Yasutoshi Horii, Toyoake; Hideyuki Kato, Nishio, both of Japan

[73] Assignee: Nippondenso Co., Ltd, Kariya, Japan

[21] Appl. No.: 408,160

[22] Filed: Mar. 21, 1995

[30] Foreign Application Priority Data

Mar. 22, 1994 [JP] Japan ................... 6-050842
Mar. 8, 1995 [JP] Japan ................... 7-048075

[51] Int. Cl.⁶ ................................. G02B 6/00
[52] U.S. Cl. ................... 362/32; 362/61; 362/351
[58] Field of Search ................... 362/32, 61, 303, 362/308, 351; 385/31, 33

[56] References Cited

U.S. PATENT DOCUMENTS

| | | | |
|---|---|---|---|
| 4,562,519 | 12/1985 | Deves | 362/308 |
| 5,222,793 | 6/1993 | Davenport et al. | 362/32 |
| 5,257,168 | 10/1993 | Davenport et al. | |
| 5,436,806 | 7/1995 | Kato | 362/32 |
| 5,499,166 | 3/1996 | Kato et al. | 362/61 |

FOREIGN PATENT DOCUMENTS

| | | |
|---|---|---|
| 0493257 | 7/1992 | France . |
| 4320554 | 12/1993 | Germany . |
| 2243208 | 10/1991 | United Kingdom . |

*Primary Examiner*—Ira S. Lazarus
*Assistant Examiner*—Sara Sachie Raab
*Attorney, Agent, or Firm*—Cushman, Darby & Cushman IP Group of Pillsbury Madison & Sutro LLP

[57] ABSTRACT

An illuminating device for a vehicle head lamp which defines a clear cut line of light distribution pattern. The light from a light source is transmitted through an optical fibre and is incident to a light conducting path lens from the optical fibre in a predetermined pattern defined by a shade. The light conducting path lens condenses and irradiates at an outgoing plane the light from a light incident plane. Thus, light distribution pattern is defined by the shape of the shade and the optical characteristics of the light conducting path lens. An end section of the shade defines an upper cut line, particularly at an opposite lane side, of the light distribution pattern. The shade is provided coincidentally with an optical axis of the outgoing plane of the light conducting path lens. Thus, the upper cut line of the light distribution pattern at the side of the opposite lane side is defined clearly and, hence, a wide illuminating range extending to the opposite lane can be provided without causing glare to drivers of vehicles on the opposite lane.

13 Claims, 6 Drawing Sheets

ILLUMINATING DEVICE

CROSS REFERENCE TO RELATED APPLICATIONS

This application is based on and claims priorities of Japanese Patent Applications No. 6-50842 filed on Mar. 22, 1994 and No. 7-48075 filed on Mar. 8, 1995, the contents of which are incorporated herein by reference.

BACKGROUND OF THE INVENTION

1. Field of the Invention

The present invention generally relates to an illuminating device capable of irradiating light from a light source in a predetermined light distribution pattern having a specified form and is adapted to be employed as a vehicle's headlamp and the like with especially clear cut lines of light distribution pattern.

2. Related Art

An example of conventional illuminating device is disclosed by the Japanese Patent laid-open No. H6-68702. The illuminating device is constructed for use on a vehicle, in which light from a single light source is branched by a plural number of optical fibres and conducted to lens bodies for light distribution toward the vehicle front area. Further, shades are used to obtain a light distribution pattern which is required for a vehicle. Using the shades in such a manner enables to obtain a desired light distribution pattern, to prevent a glare against drivers of vehicles running on the opposite lane while it can illuminate over a wide area extending even to the opposite lane in a short distance range.

However, with the abovementioned prior art, a cut line, i.e., a boundary between the illuminated area and the not illuminated area, may have been formed by shadows of shades but it could not provide sufficiently clear cut line. It is especially important that, for prevention of glare toward a vehicle driver on the opposite lane, the cut line at top or at the opposite lane side of the light distribution pattern is formed clearly.

Further, in the prior art, provision of a lens for concentrated (hot zone) light distribution pattern and a lens for flat light distribution pattern is proposed but it is necessary to coincide the cut lines at the top and at the opposite lane side of both lenses. Accordingly, the prior art proposes to coincide the cut lines of both lenses by moving the optical axis of one lens in parallel or by moving rotatablly, however, there still is a problem that the cut lines as a whole can not be made sufficiently clear because the cut lines of both lenses or one lens are not sufficiently clear.

SUMMARY OF THE INVENTION

In view of the problem of the abovementioned prior art, the present invention intends to provide an illuminating device which enables to form clear cut lines.

According to the present invention, an illuminating device comprises a light source, a lens body irradiating light from the light source, and a defining member being disposed on the light path from the light source to the lens body and defining the light distribution pattern. The defining mamber is formed with an end section defining the cut line of the light distribution pattern. In the case that the illuminating device is used as a headlamp of a vehicle, the end section of the defining member which defines the upper cut line of the light distribution pattern is disposed approximately coincident with the optical axis of the lens bodies.

Here, the defining member can be a shade which covers incident light plane of the lens body corresponding to the light distribution pattern, of which the end section is disposed approximately coincident with the optical axis of the lens body.

In addition, the defining member can be a light conducting path member which has an outgoing light plane corresponding to the light distribution pattern, of which the end section of the outgoing light plane is disposed approximately coincidentally with the optical axis of the lens body.

Further, it can take a construction which is equipped with optical fibres conducting light from the light source to the incident light planes of the lens body and the defining member is disposed between the outgoing light plane of the optical fibres and the incident light plane of the lens body.

The lens body is desired to have a flat incident light plane and curved outgoing light plane which defines the optical axis, and to be a light conducting path lens of which a space between the incident light plane and the outgoing light plane is filled with a medium.

Further the lens body is desired to have a form which is approximately fan-shaped in the side view and approximately rectangular in the front view, and besides the outgoing light plane of the lens body is designed to form a lens plane of specified radius of curvature.

It is possible also to arrange the optical axis of the lens body out of the lens body, to provide reflecting plane extending along the optical axis for the lens body and to dispose the end section of the defining member approximately coincidentally with an imaginary optical axis projected within the lens body when taking the reflecting plane as the symmetrical plane.

It is possible further, provided that the lens body is taken as a first lens, to provide a second lens which has a different light condensing characteristic from that of the first lens, and besides to provide for the second lens an outgoing light plane having the optical axis within the lens body, a reflecting surface extending along the optical axis and a second defining member having the end section disposed approximately coincidental with the optical axis of the second lens.

According to the constructions of the present invention as described above, since the end section which defines the cut line of the light distribution pattern, is provided approximately coincidentally with the optical axis of the lens body, clear cut line with less diffusion can be obtained on the extension of the optical axis.

When the illuminating device is used as a headlamp of a vehicle, it is desirable that the end section, which define the upper cut line of light distribution pattern, is disposed approximately coincident with the optical axis of lens body so that an excessive upward irradiation can be prevented. According to such construction, an excessive irradiation toward the opposite lane can be prevented and thus the glare against drivers of automobiles running on the opposite lane can be reduced.

The defining member uses the shade which covers the incident light plane to the lens body corresponding to the light distribution pattern of which the end section can be so constructed as coincident with the optical axis of the body, so that clear cut line can be obtained with a simple construction.

Further, the defining member uses the light conducting path member having the outgoing light plane corresponding to the light distribution pattern, of which the end section of the outgoing light plane is disposed approximately coincident with the optical axis of the lens body so that the light loss is reduced and a highly efficient light conduction is achieved.

It is possible also to provide optical fibres which guides light from the light source to the incident light plane of the lens body so as to make a construction that the defining member is disposed between the outgoing light plane of the optical fibres and the incident light plane of the lens body so that the light source can be provided separately from the lens body.

To minimize the light loss, the lens body is formed by the light conducting path lens which has flat incident light plane and the curved outgoing light plane to define the optical axis, of which a medium is filled between the incident and outgoing light planes.

Further, the lens body has a form which is approximately fan-shaped in the side view and approximately rectangular in the front view, and besides the outgoing light plane of the lens body is designed to form the lens plane of the specified radius of curvature so that, since the optical axis of lens plane in such form is given an expansion as the optical axis plane, the end section of the defining member and the optical axis plane can be approximately coincided each other and, as a result, the clear cut line can be obtained over a wide area.

It is so arranged that the optical axis of the lens body out of the lens body, to provide the reflecting plane extending along the optical axis for the lens body and to dispose the end section of the defining member approximately coincidental with the imaginary optical axis projected within the lens body when taking the reflecting surface as the symmetrical plane, so that the clear cut line can be obtained even if there is a reflecting surface.

It is possible further, provided that the lens body is taken as the first lens, to provide the second lens which has a different condensing characteristic from that of the first lens, and besides to provide for the second lens outgoing light plane having optical axis within the lens body, reflecting surface extending along the optical axis and the second defining member having the end section disposed approximately coincident with the optical axis of the second lens body so that, even if a plural number of lenses which have different condensing characteristics are equipped, both cut lines obtained by those lenses can be made clearly cut.

DETAILED DESCRIPTION OF THE PREFERRED EMBODIMENTS

The present invention will be described in full detail with reference to presently preferred embodiments in which an illumination device is used as a vehicle headlamp or headlight.

First Embodiment

Figure 1:
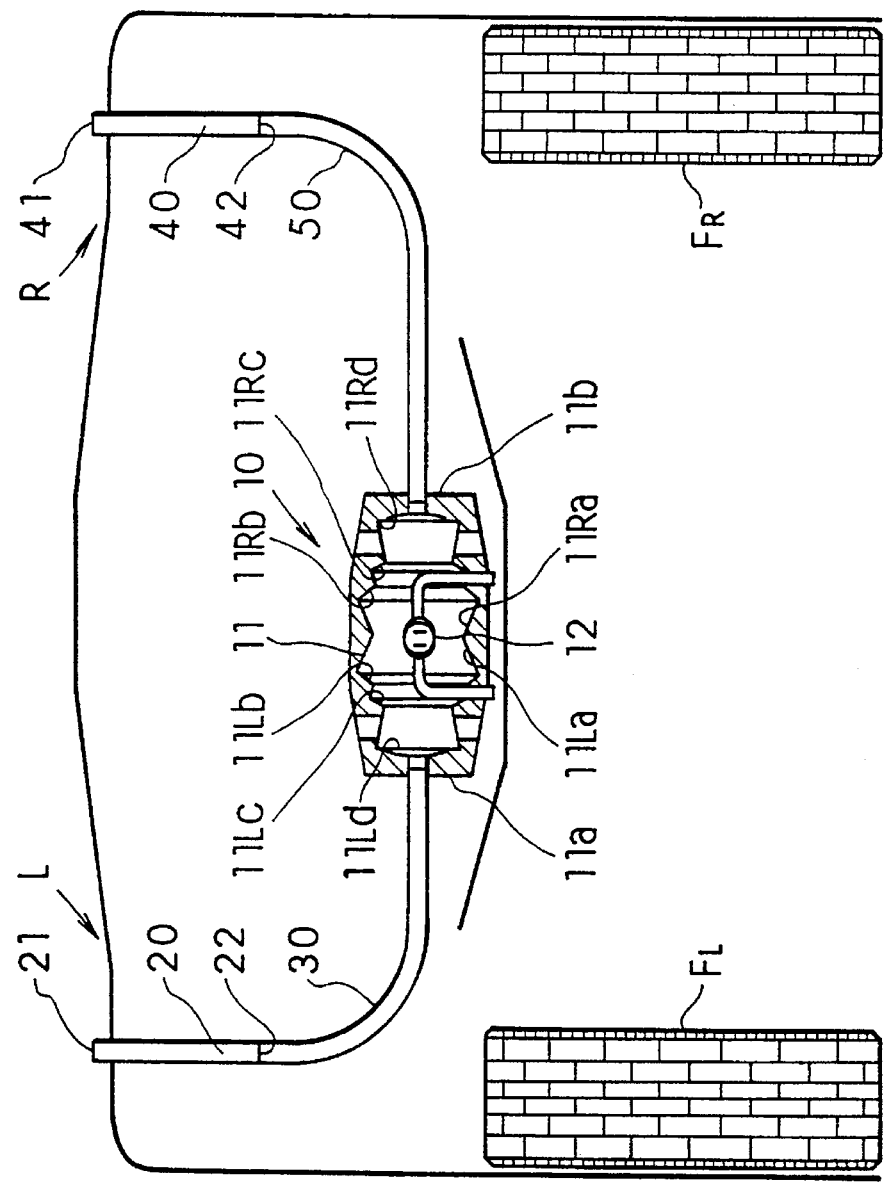
FIG. 1 is a schematic view of a first embodiment of the illuminating device for vehicle in accordance with the present invention.

FIG. 1 illustrates the first embodiment of the illuminating device for vehicle on a vehicle. The device is composed by a light source 10 disposed at the center at the front part of vehicle at the front of a front right wheel FR and a front left wheel FL. A pair of head lamps L and R are disposed symmetrically against the light source 10. The light source 10 has an approximately cylindrical casing 11 in which a discharge tube 12 is disposed at the center in the axial direction as a linear light source. Further, on the internal peripheral surface of the casing 11, each of left side oval mirrors 11L$a$ through 11L$d$ and each of right side oval mirrors 11R$a$ through 11R$d$ are disposed respectively symmetrically over the discharge tube 12 at the center. Here, light emitted from the discharge tube 12 is reflected by the right side oval mirror 11R$a$ and each of left side oval mirrors 11L$b$ through 11L$d$ so as to be condensed at the center of right side wall 11$b$ of the casing 11, while the light is reflected by the left side oval mirror 11L$a$ and each of right side oval mirrors 11R$b$ through 11R$d$ so as to be condensed at the center of the left side wall 11$a$.

The left headlamp L has a light conducting path lens 20 constituting the lens body disposed at the left front end section of the vehicle and a single optical fibre 30 which connects the light conducting path lens 20 and the light source 10. On the other hand, the right headlamp R has a light conducting path lens 40 constituting the lens body disposed at the left front end section of the vehicle and a single optical fibre 50 which connects the light conducting path lens 40 and the light source 10.

Figure 2:
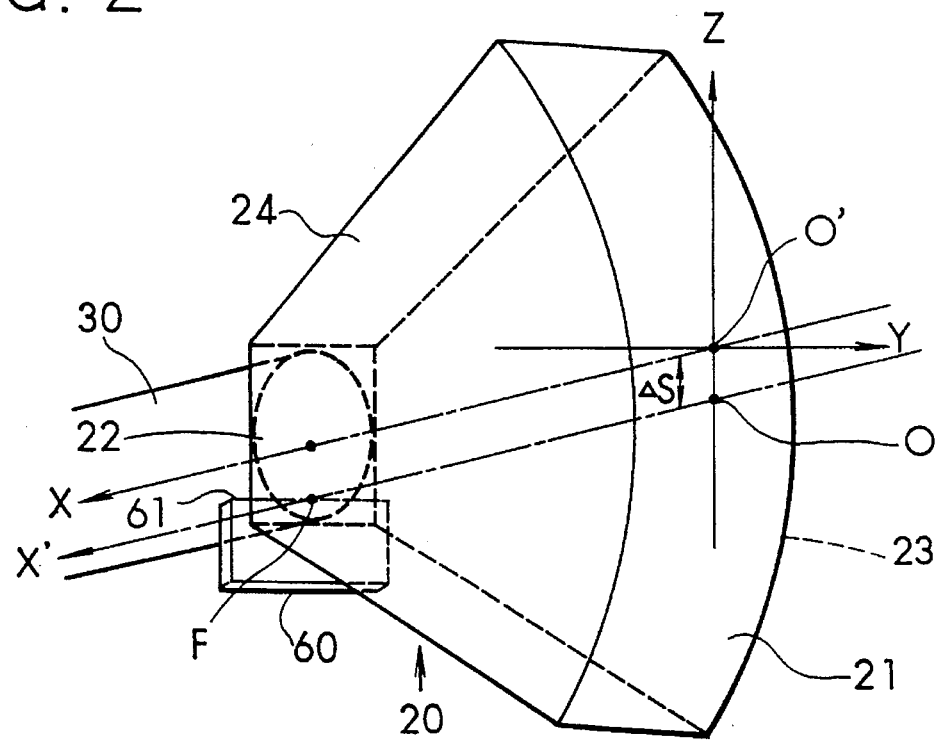
FIG. 2 is a partial enlarged perspective view illustrating the lamp device according to the first embodiment.
Figure 3:
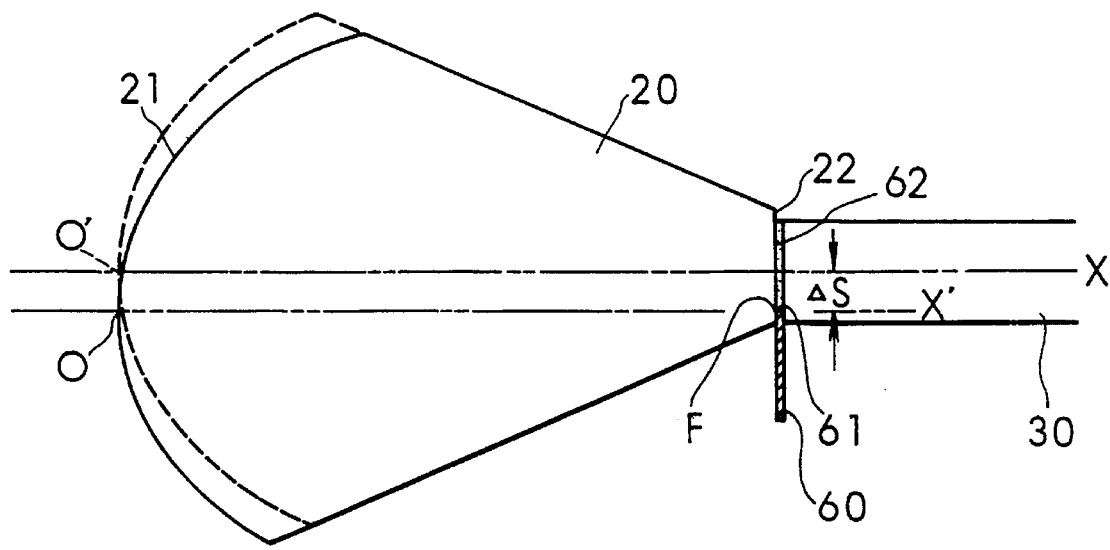
FIG. 3 is a side elevation illustrating the lamp device according the first embodiment.

FIG. 2 and FIG. 3 illustrate the shape of the light conducting lens 20 based on a three-dimensional cartesian coordinate system X, Y and Z. The axial line of the optical fibre 20 is denoted as the X-axis, the intersection of the X-axis and the outgoing light plane of the light conducting path lens 20 is denoted as the origin, the horizontal direction is denoted as the Y-axis and the vertical direction is denoted as the Z-axis. The light conducting path lens 20 is made of a material which has a higher thermal resistance and light transmission (for example, polycarbonate or acrylic resin material). Further the form of lens is fan-shaped when seen from the side and rectangular when seen from the front. Outgoing light plane 21 makes a lens plane having a specified radius of curvature along the Z axis direction, of which the most protruding pole O on the outgoing light plane 21 is offset downwards from the origin by $\Delta S$ and the optical axis X' passing through the pole O on the outgoing light plane 21 is also offset downwards from X-axis by $\Delta S$ (FIG. 3). In addition, an object side focus F (rear focus) of the outgoing light plane 21 is located on the optical axis X' near a small diameter incident light plane 22 of the light conducting path lens 20. The outgoing light plane 21 of the light conducting path lens 20 passes through the optical axis X' and besides has an optical axis plane being parallel with the Y-axis in the horizontal direction. Further, both side faces 23 and 24 of the fan-shaped light conducting path lens 20 are flat and make reflecting surfaces in the lens. With the light conducting path lens as described above, it is important that the space between the incident and outgoing light planes is filled completely with a homogeneous medium.

The optical fibre 30 consists of a core (not shown) made of a material or having a similar refractive index of light as the light conducting path lens 20 and a clad (not shown) which covers the core. Here, the core is made of a material having a higher thermal resistance and light transmission characteristic (for example, polycarbonate or acrylic resin) and the clad is also made of a material having a higher thermal resistance and light transmission characteristic (for example, fluororesin material). The refractive index of light of the clad material is different from and smaller than that of the core so as to ensure a total reflection of light within the core. The core of the optical fibre 30 has a diameter of approximately 8 mm to 10 mm is bent approximately resembling the letter L and fixedly attached to the center of left side wall 11a of the light source 10 as shown in FIG. 1. The maximum incident angle of light from the light source 10 against the incident light end plane of the core of optical fibre 30 is approximately 30° (degrees).

As illustrated in FIG. 2 and FIG. 3, a shielding material (shade) 60 which defines the light distribution, is disposed between the incident light plane 22 of light conducting lens 20 and the outgoing light plane of optical fibre 30. The shade 60 is made of an opaque material such as a metal plate, for example. The space formed by inserting the shade 60 between the incident light plane 22 of light conducting path lens 20 and the outgoing light plane of optical fibre 30 is filled with a transparent adhesive 62 like a transparent acrylic adhesive, for example, so that these two planes are adhered fixedly. Here, the bottom edge of outgoing light plane of optical fibre 30 is shut off from the incident light plane 22 of light conducting lens 20 by the upper edge 61 of shade 60. Further, the upper edge 61 of shade 60 is disposed on the optical axis X' extending from the pole O on the outgoing light plane 21 of light conducting lens 20. Moreover, the upper edge 61 of shade 60 is set in parallel with Y axis and the upper edge 61 of shade 60 coincides with the optical axis plane of light conducting path lens 20. The upper edge 61 may be fixed dislocated from the optical axis within an error approximately equal to the assembly tolerance. The upper edge 61 of shade 60 provides the upper cut line 51 of the light distribution pattern.

Although the first embodiment according to the present invention employs the shade 60 as a plate, the shade 60 may be substituted with a masking by an opaque paint applied over unnecessary part at the lower edge section of incident light plane 22 of light conducting lens 20.

The light conducting lens 40 of the headlamp R is composed same as the light conducting path lens 20. The optical fibre 50 is composed same as the optical fibre 30. Further, as shown in FIG. 1, the optical fibre 50 is bent as resembling the letter L, fixedly attached to the center of right side wall 11b of light source 10 and the maximum incident angle of light from the light source 10 against the incident end plane of the core of the optical fibre is approximately 30° (degrees).

Operation of the first embodiment constructed as described above is explained below. Since the operations of the two headlamps L and R are the same, description is made only with respect to the left headlamp L.

When a high voltage is applied to the discharge lamp 12 of the light source 10 from a circuit which is not shown, the light source 10 illuminates. The light is introduced through incident edge plane of the optical fibre 30 and guided further therethrough while being reflected by the total reflection. The light is emitted from the outgoing end plane of optical fibre 30 toward the light conducting lens 20. In this case, since the core of optical fibre 30 and the light conducting path lens 20 are made of the same material or materials having similar refractive indexes of light and besides the joint between the light conducting path lens 20 and the optical fibre 30 is fixedly adhered with the transparent adhesive 62, the light is introduced efficiently from the optical fibre 30 to the light conducting path lens 20. As a result, the light can be introduced efficiently from the optical fibre 30 to the light conducting path lens 20 without causing a reflection of light by dirt, dust, etc. on the joint of the optical fibre 30 and the light conducting path lens 20 and thus the optical system of the headlamp L can be constructed with a low cost.

Since the shade 60 is inserted between the light conducting path lens 20 and the optical fibre 30 and the lower part of incident light plane 22 of the light conducting path lens 20 is shielded, a part of light emitted from the outgoing end plane of optical fibre 30, that is, the light under the upper edge 61 of shade 60, is shut off.

Since the right and left sides 23 and 24 of the light conducting path lens 20 are exposed to air of which the refractive index of light is small, light introduced through these sides 23 and 24 into the light conducting path lens 20 is reflected by the total reflection. Therefore, no light will leak outside from the right and left sides 23 and 24 of the light conducting path lens 20. As a result, light coming into the light conducting path lens 20 is guided forward while being reflected alternately between the right and left sides 23 and 24 by the total reflection, as shown in FIG. 4B. In this case, light spread angle β of the light emitted from the outgoing light plane 21 to right and left is expressed by the following equation, provided the incident angle to the light conducting path is θ;

$$\beta = 2\sin^{-1}(2n\sin(\theta - N\alpha))$$

where, α represents the spread angle of light conducting path lens 20, n the refractive index of light of the light conducting path lens 20 and N the number of reflections of light within the light conducting path lens 20. Therefore, the light spread angle β of light emitted from the outgoing light plane 21 of light conducting path lens 20 to right and left can be changed optionally by adjusting the spread angle α of light conducting path lens 20.

As a result, the light thus guided spreads from the outgoing light plane 21 of light conducting path lens 20 in the horizontal direction while it is emitted as rather flat light in the vertical direction. In this case, the spread angle of light emitted from the outgoing light plane 21 of light conducting path lens 20 reaches up to 60 degrees.

Figure 4A:
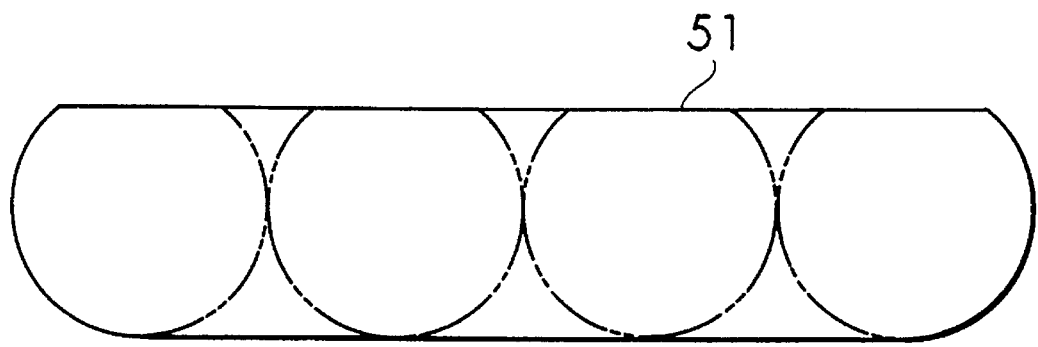
FIG. 4A and FIG. 4B illustrate the illumination pattern and the the reflection mode of the incident light in a light conducting path lens according to the first embodiment, respectively.
Figure 4B:
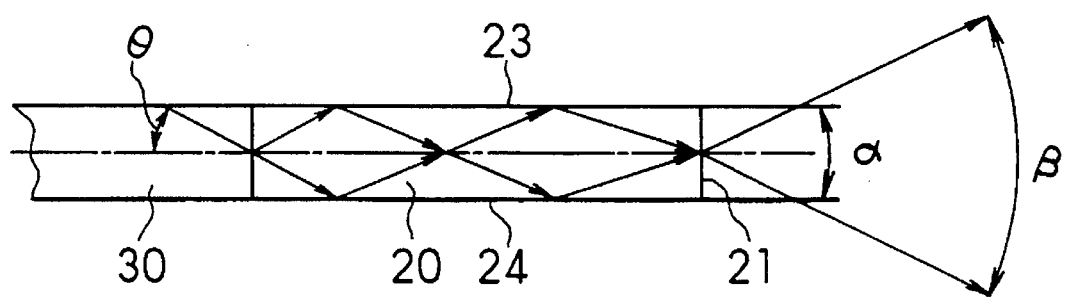

Since the lower part of the incident light to the light conducting path lens 20 is shielded by the shade 60, the upper part of outgoing light is clearly cut at the boundary of cut line 51 as shown in FIG. 4A. In this case, the outgoing light from the outgoing light plane 21 can be projected with a clear pattern in the forward direction without expanding upward at the vehicle front. Therefore, light projects to a far area in front of the vehicle without causing a glare against vehicles running on the opposite lane.

Figure 5:
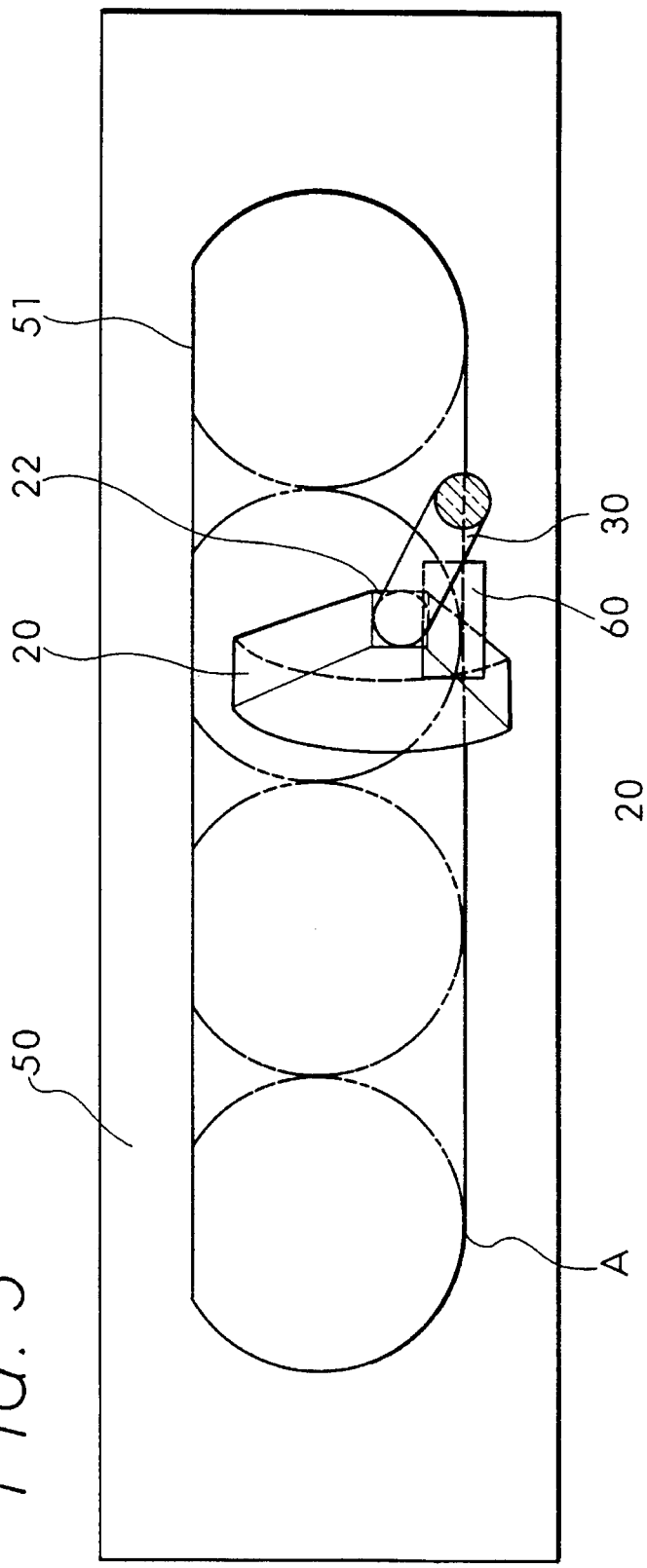
FIG. 5 is a perspective view illustrating the lamp device according to the first embodiment and the light distribution curve.

By an experiment conducted to test the light distribution characteristic of the headlamp L according to the first embodiment of the present invention, the illumination pattern shown in FIG. 5 was obtained. Symbol A in the figure represents the light distribution curve of light irradiated to a screen 50 from the outgoing light plane 21 of light conducting path lens 20 while numeral 51 designates the cut line defined by the upper edge 61 of shade 60.

As explained above, according to the first embodiment of the present invention, since the optical axis X' of light conducting path lens 20 and the shade 60 are disposed in a relative location that will make the upper part of light distribution forming the light distribution 51 of desired cut line, the upper part of light distribution made by the outgoing light from the light conducting path lens 20 forms the light distribution 51 of desired cut line. In this case, since the illuminating device has a so simple construction as the light conducting path lens 20 and the optical fibre 30 being connected and the shade 60 being inserted between the light conducting path lens 20 and the optical fibre 30, such an illuminating device can be manufactured in a simple construction and a low cost. Further, the upper part of light distribution can be made to form the light distribution 51 of clear cut line so that the glare against vehicles on the opposite lane will be prevented. Moreover, the optical fibre 30 and the light conducting path lens 20 are directly connected via a transparent adhesive and the joint between these members are not contaminated by dirt or duct so that the outgoing light from the optical fibre 30 can be efficiently introduced into the light conducting path lens 20 without a loss.

Second Embodiment

Figure 6:
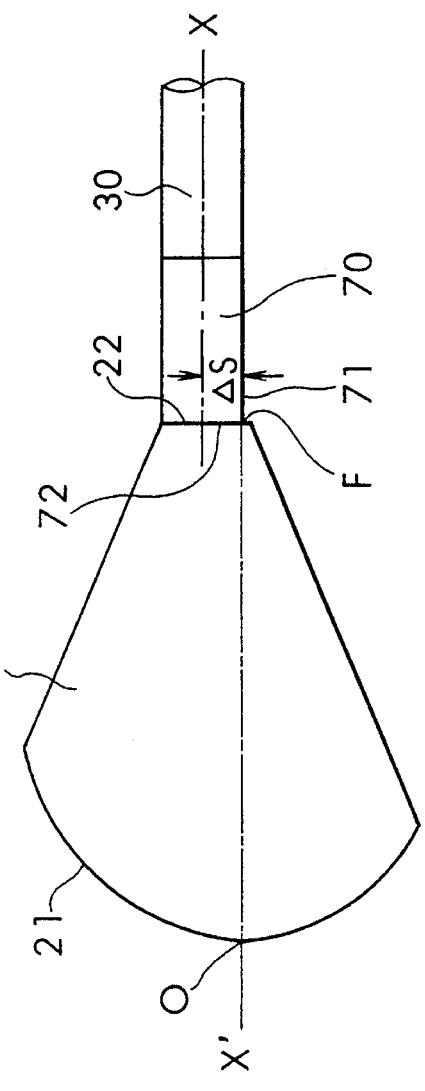
FIG. 6 is a side elevation illustrating the lamp device according to a second embodiment.

In the second embodiment shown in FIG. 6, a rod-shaped light conducting path 70 which has an outgoing light plane to form a light distribution of desired cut line is employed in place of the shade 60 which is used in the first embodiment. The rod-shaped path 70 has a semi-circular, rectangular or oval cross section, and the light conducting path lens 20 and the optical fibre 30 have the same structures as in the first embodiment.

As shown in FIG. 6, the rod-shaped light conducting path 70 of which the lowermost part is formed flat, is disposed between the incident light plane 22 of light conducting path lens 20 and the outgoing light plane of optical fibre 30. The rod-shaped light conducting path 70 is made of the same material or a material having a similar refraction index of light as the light conducting path lens 20, such as polycarbonate, acrylic resin material, etc., for example. In addition, a transparent adhesive such as a transparent acrylic adhesive, for example, is used to fixedly attach the incident light plane 22 of light conducting path lens 20 and the outgoing light plane of the light conducting path 70 as well as to attach the optical fibre 30 and the light conducting path 70.

In this case, the lowermost edge of the outgoing light plane 72 of light conducting path 70 makes a straight line being in parallel with Y-axis and is continuous from the bottom side plane 71 of light conducting path 70. In addition, the lowermost edge straight line is disposed on the optical axis X' of the light conducting lens 20.

The second embodiment also provides the same light distribution pattern as in FIG. 5 and the clear cut line 51 is obtained. As described above, the straight line at the lowermost edge of outgoing light plane of light conducting path 70 defines the upper cut line 51 of the light distribution pattern A.

Further, since the shade according to the abovementioned first embodiment is not used, the entire light coming into the light conducting path 70 is emitted to the light conducting path lens 20 with a reduced light loss so that the outgoing light from the optical fibre 30 can be introduced into the light conducting path lens 20 without a loss. Thus, increased optical efficiency is obtained.

Although the light conducting path 70 having the shape of cross-section shown in FIG. 6 is used in the second embodiment, the cross-section may be semi-circular, quadrangle or oval so far as the bottom straight line is provided on the outgoing light plane when seen from the front (left in the figure). Further, the light conducting path lens 20 and the light conducting path 70 may be cast as an integral member on which the cut line is defined by a step formed at the focus F.

Third Embodiment

Figure 7:
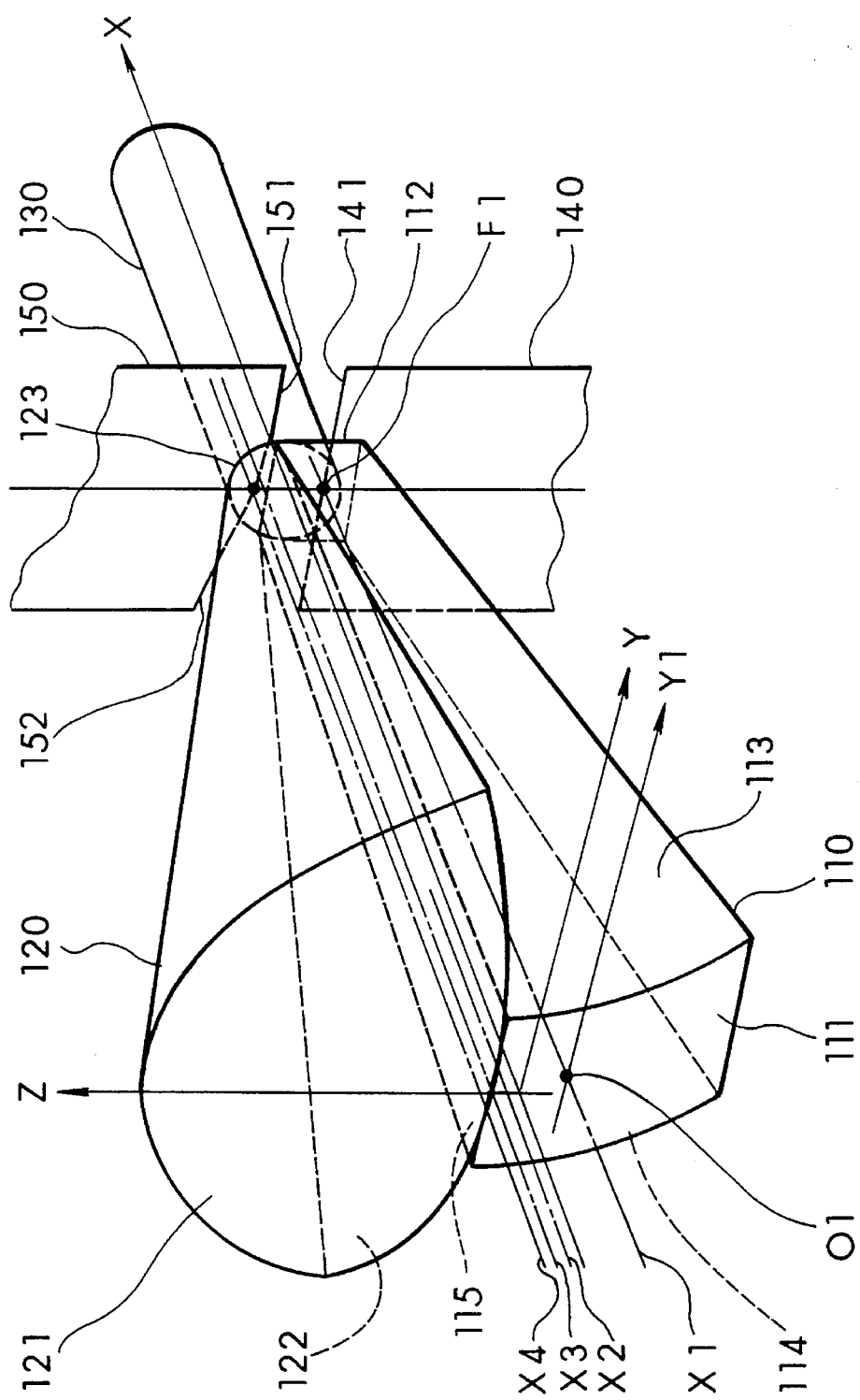
FIG. 7 is a perspective view illustrating the lamp device according to a third embodiment.
Figure 8:
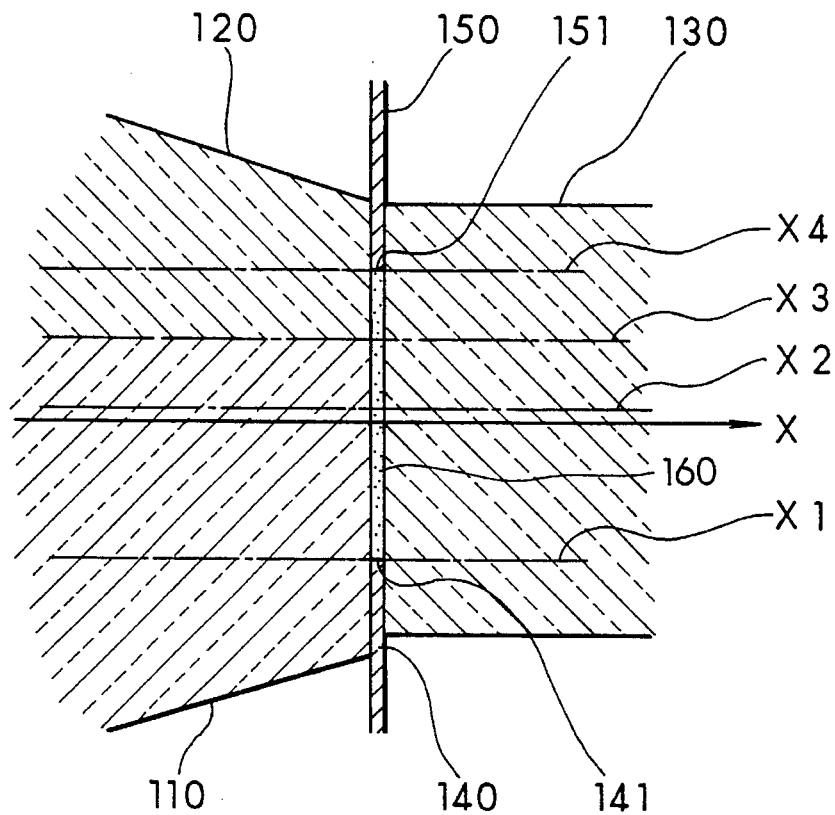
FIG. 8 is an enlarged cross-sectional view illustrating the lamp device according to the third embodiment.

Next, the third embodiment is described referring to FIG. 7 and FIG. 8 illustrating a perspective view of the lamp section and an enlarged cross-section depicting the relation of the edge of shade and the optical axis, respectively.

In this embodiment, a first lens 110 which forms a flat light distribution spreading in the horizontal direction, and a second lens 120 which forms a condensed light distribution are arranged on the extension of a common optical fibre 130. In addition, shades 140 and 150 are provided corresponding to each lens and the space between both lenses and the outgoing light plane of optical fibre 130 is filled with a transparent resin adhesive 160.

Outgoing light plane 111 of first lens 110 has a straight cut line at the bottom thereof in the Y-axis direction and the optical axis X1 spreads as a plane along the axis Y1. Further, the first lens 110 passes over points O1 and F1 and has the optical axis X1 which is parallel with the axis X of optical fibre 130. The focus F1 is approximately coincident with the incident light plane 112. Vertical side planes 113 and 114 and a horizontal plane 115 of the first lens 110 constitute total reflecting surfaces. Horizontal and straight line edge section 141 of the shade 140 is coincidental with the focus F1 and also disposed in parallel with the axis Y1.

The second lens 120 has a form of a conical lens which is cut down on a plane which passes an axis X3 and is perpendicular to the radius. Outgoing light plane 121 of the second lens 120 has a curved plane. Horizontal plane 122 which passes the axis X3 and is perpendicular to the radius constitutes a total reflecting surface. The second lens 120 has an optical axis X2 below the horizontal plane 122, i.e., outside the second lens 120. The optical axis X2 is in parallel with the the X axis of optical fibre 130. If the optical axis X2 is projected taking the reflecting surface 122 as the symmetrical plane, an imaginary optical axis X4 is obtained in the second lens 120. It should be noted that the focus on the outgoing light plane 121 is also projected on the incident light plane 123. In addition, the near center of horizontal straight edge line section 151 is disposed intersecting with the imaginary optical axis X4. Further, the horizontal straight line edge section 151 of the shade 150 is located approximately corresponding to the projected focus. The shade 150 has an inclined edge section 152 in order to illuminate far end area at the left side, that is, the footpath side.

Since the edge section 141 of shade 140 at the upper portion thereof is disposed coincident with the optical axis X1 of the first lens 110 according to this embodiment, the upper cut line of flat light distribution is produced clearly. In addition, since the edge or end section 151 of the shade 150 is disposed coincident with the imaginary optical axis X4 being projected via the reflecting surface, the cut lines at the upper side as well as the opposite lane side of concentrated light distribution are clearly illuminated. As a result, a wide area from the footpath side to the opposite lane side (right side) can be illuminated and at the same time the glare against drivers of vehicles running on the opposite lane can be reduced.

Moreover, since the upper cut line of flat light distribution is formed by the optical axis X1 of the first lens 110 and the cut line at the upper and opposite lane sides of concentrated light distribution is formed by the optical axis X2 of the second lens 120, the displacement of both cut lines is limited to that of optical axes X1 and X2 so that both cut lines can be approximately coincided each other on the road surface beyond about 10 meters ahead.

It should be noted that the distances between axes X and X3, X3 and X1, X and X2 and X3 and X4 respectively are set depending on the light quantity ratio of the flat light distribution and the concentrated light distribution, center position of light distribution pattern relative to the axis X and other factors.

The foregoing explanation has been made with reference to a vehicle which runs at the left-hand side lane, however, the same explanation can be applied also to a vehicle running at right-hand side lane by inverting the right and left relation of the shade 150.

Figure 9:
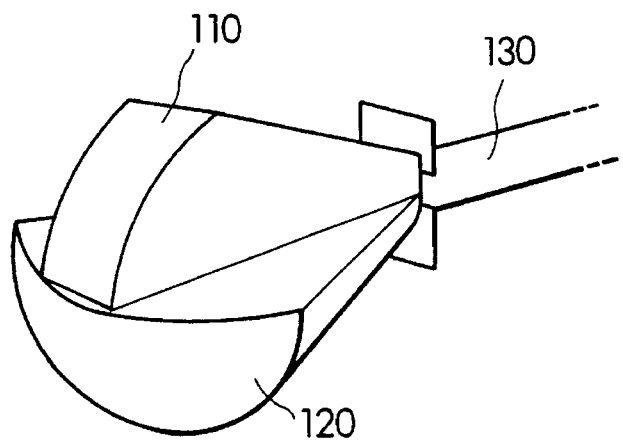
FIG. 9 is a perspective view illustrating a modified example of the lamp device according to the third embodiment.

Further, in the third embodiment, the first lens 110 forming the flat light distribution is arranged at the bottom side while the second lens 120 for forming the concentrated light distribution at the top side, however, the relation of top and bottom may be inverted as illustrated in FIG. 9. In this case, the first lens 110 forming the flat light distribution is arranged to have an optical axis outside the lens while the second lens 120 forming the concentrated light distribution is arranged to have an optical axis within the lens.

The shape of the second lens 120 for forming the concentrated light distribution is not limited to an approximate semi-circle but it may take an approximate quarterly cut circle.

The present invention having been described hereinabove is not limited but may be modified in many other ways without departing from the spirit of the invention.

What is claimed is:

1. An illuminating device comprising;

a light source;

lens body means irradiating light from said light source; and defining member means disposed on a light path from said light source to said lens body means and defining a predetermined light distribution pattern, wherein said defining member means has an end section which defines a cut line of said light distribution pattern and which is disposed approximately coincident with an imaginary optical axis of said lens body means, and wherein said lens body means has an optical axis at an outside thereof and a reflecting surface along said optical axis, and wherein said imaginary optical axis is a projected image of said optical axis obtained when using said reflecting surface as a symmetrical projection plane.

2. An illuminating device according to claim 1, wherein said end section is disposed approximately coincident with a focus of said lens body means.

3. An illuminating device according to claim 1, wherein said lens body means is mounted at a front of a vehicle as a headlamp of said vehicle, and wherein said end section defines said cut line at an upper side of said light distribution pattern.

4. An illuminating device according to claim 1, wherein said lens body means is mounted at a front of a vehicle as a headlamp of said vehicle, and wherein said end section defines said cut line at an upper and opposite lane sides.

5. An illuminating device according to claim 1, wherein said lens body means has an optical axis plane extending along said optical axis, and wherein said end section of said defining member means is approximately coincident with said optical axis plane.

6. An illuminating device according to claim 1, wherein said defining member means includes a shade shielding an incident light to said lens body means to provide said light distribution pattern.

7. An illuminating device comprising;

a light source;

lens body means irradiating light from said light source; and defining member means disposed on a light path from said light source to said lens body means and defining a predetermined light distribution pattern, wherein said defining member means has an end section which defines a cut line of said light distribution pattern and which is disposed approximately coincident with at least one of an optical axis and or an imaginary optical axis of said lens body means, and wherein said lens body means has a flat incident light plane and a curved outgoing light plane which defines said optical axis, and wherein a space between said incident light plane and said outgoing light plane is filled with a medium so as to make a light conducting path lens, a focus of said outgoing light plane existing approximately on said incident light plane and said end section of said defining member means being disposed approximately coincident with a focus of said lens body means.

8. An illuminating device according to claim 7, wherein an optical fibre is disposed between said defining member means and said light source, and wherein said defining member means is disposed between said incident light plane of said lens body means and said outgoing light plane of said optical fibre.

9. An illuminating device comprising;.

a light source;

lens body means irradiating light from said light source; and defining member means disposed on a light path from said light source to said lens body means and defining a predetermined light distribution pattern, wherein said defining member means has an end section which defines a cut line of said light distribution pattern and which is disposed approximately coincident with an imaginary optical axis of said lens body means, wherein said lens body means includes a first lens body and a second lens body which provides a light distribution different from that of said first lens body, and wherein said defining member means includes a first defining member which defines a light distribution of said first lens body and a second defining member which defines a light distribution of said second lens body, wherein said lens body means is mounted on a front of a vehicle as a headlamp of said vehicle, and wherein said first lens body and said second lens body are arranged at top and bottom, and said end section of said first and second defining members define said upper cut line of the light distribution pattern, wherein said second lens body forms said light distribution which is asymmetrical at right and left, and wherein said end section of said second defining member defines said cut line at the opposite lane side, wherein said second lens body has an optical axis at an outside of said lens body means and a reflecting surface along said optical axis, and wherein a projected image of said optical axis obtained by taking said reflecting surface as a symmetrically projection plane is an imaginary optical axis.

10. An illuminating device according to claim 9, wherein said first lens body and said second lens body form a flat light distribution and a concentrated light distribution, respectively, and wherein said first lens body is located under said second lens body.

11. An illuminating device according to claim 10, wherein optical fibres are disposed between said first and second defining members and said light source.

12. An illuminating device according to claim 9, wherein said first lens body and said second lens body form a flat light distribution and a concentrated light distribution, respectively, and wherein said first lens body is located on top of said second lens body.

13. An illuminating device according to claim 12, wherein optical fibres are disposed between said first and second defining members and said light source.

* * * * *